United States Patent
Mitsugi (10) Patent No.: US 12,024,184 B2
(45) Date of Patent: Jul. 2, 2024

(54) ECU, MONITORING ECU, AND CAN SYSTEM

(71) Applicant: Mitsubishi Electric Corporation, Tokyo (JP)

(72) Inventor: Tatsuya Mitsugi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 763 days.

(21) Appl. No.: 17/282,083

(22) PCT Filed: Dec. 25, 2018

(86) PCT No.: PCT/JP2018/047504
§ 371 (c)(1),
(2) Date: Apr. 1, 2021

(87) PCT Pub. No.: WO2020/136707
PCT Pub. Date: Jul. 2, 2020

(65) Prior Publication Data
US 2021/0370961 A1    Dec. 2, 2021

(51) Int. Cl.
*H04L 12/40* (2006.01)
*B60R 16/023* (2006.01)
*B60W 50/04* (2006.01)

(52) U.S. Cl.
CPC ......... *B60W 50/04* (2013.01); *B60R 16/0231* (2013.01); *H04L 12/40* (2013.01); *H04L 2012/40215* (2013.01); *H04L 2012/40273* (2013.01)

(58) Field of Classification Search
CPC .... B60W 50/04; B60R 16/0231; H04L 12/40; H04L 2012/40215; H04L 2012/40273
See application file for complete search history.

(56) References Cited

U.S. PATENT DOCUMENTS

2015/0124597 A1   5/2015   Mabuchi et al.
2017/0099201 A1   4/2017   Segawa

FOREIGN PATENT DOCUMENTS

| JP | 2007-96799 A | 4/2007 |
| WO | WO 2013/171829 A1 | 11/2013 |
| WO | WO 2015/194323 A1 | 12/2015 |

OTHER PUBLICATIONS

International Search Report (PCT/ISA/210) issued in PCT/JP2018/047504 mailed on Mar. 26, 2019.

*Primary Examiner* — Mathew Franklin Gordon
(74) *Attorney, Agent, or Firm* — Birch, Stewart, Kolasch & Birch, LLP (57) ABSTRACT

An object of the present invention is to accumulate data in an ECU related to a CAN message transmitted by an ECU in a CAN system. An ECU according to the present invention is an ECU among a plurality of ECUs connected to a CAN communication line, the ECU includes a transmission unit configured to transmit first CAN messages to other ECUs of the plurality of ECUs, and an accumulation unit configured to accumulate CANIDs of the plurality of first CAN messages transmitted by the transmission unit as transmission CANIDs.

9 Claims, 13 Drawing Sheets

FIG. 2

| CANID | CANDATA |
|---|---|

FIG. 3

| CANID | CANDATA |
|---|---|

| Monitoring | ECUID | Output CANID_0 | Output CANID_1 | ... | Output CANID_n |
|---|---|---|---|---|---|

ECU, MONITORING ECU, AND CAN SYSTEM

TECHNICAL FIELD

The present invention relates to a technique for determining the legitimacy of an Electronic Control Unit (ECU) in a Controller Area Network (CAN) system.

BACKGROUND ART

In recent years, autonomous driving has come into practical use with advanced driver-assistance systems (ADAS) of vehicles and their development, and the use of machine learning, deep learning, and Artificial Intelligence (AI) for vehicle control has become widespread. Due to the use of Machine learning, deep learning, or Artificial Intelligence (AI), many vehicle control systems have a communication function communicating with a device other than the vehicle. Therefore, by using the communication function, modifying the software program of an ECU built in the vehicle from the outside of the vehicle, and the vehicle control the driver does not intend from the outside using CAN information being the communication between the ECUs can be attempted.

To solve this problem, Patent Document 1 discloses a system for monitoring the communication state of the CAN by a monitoring device.

PRIOR ART DOCUMENTS

Patent Documents

[Patent Document 1] Japanese Patent Application Laid-Open No. 2007-96799

SUMMARY

Problem to be Solved by the Invention

According to the system of Patent Document 1, the data related to the CAN message transmitted by the ECU is not accumulated in the ECU, the monitoring device that monitors the legitimacy of the ECU is required to record the transmission time, an ID of the ECU being a data destination, a data length, data content and the like each time the CAN message is transmitted on the bus, this leaves a problem that a greater load is required to execute the process.

An object of the present invention is to accumulate data in an ECU related to a CAN message transmitted by an ECU in a CAN system.

Means to Solve the Problem

An ECU according to the present invention is an ECU among a plurality of ECUs connected to a CAN communication line, the ECU includes a transmission unit configured to transmit first CAN messages to other ECUs of the plurality of ECUs, and an accumulation unit configured to accumulate CANIDs of the plurality of first CAN messages transmitted by the transmission unit as transmission CANIDs.

A monitoring ECU according to the present invention is the monitoring ECU connected to the CAN communication line along with the ECUs of the present invention, in which the monitoring ECU includes a storage unit that stores a legitimate CANID, which is a predetermined CANID for each ECU, in association with an ECUID of each ECU, a reception unit that receives the second CAN messages including the transmission CANID accumulated in the accumulation unit and the source ECUID being the ECUID of each ECU, and a collation unit that collates the transmission CANID with the legitimate CANID associated with the source ECUID in the storage unit, and determines that the first CAN message with the transmission CANID that does not match the legitimate CANID is illegitimate.

A CAN system according to the present invention includes the monitoring ECU of the present invention and a plurality of ECUs of the present invention.

Effects of the Invention

According to the present invention, the CANIDs of a plurality of first CAN messages transmitted from the ECUs are accumulated in the ECU as transmission CANIDs. The objects, features, aspects, and advantages of the present invention will become more apparent from the following detailed description and the accompanying drawings.

DESCRIPTION OF EMBODIMENTS

A. Embodiment 1

Figure 1:
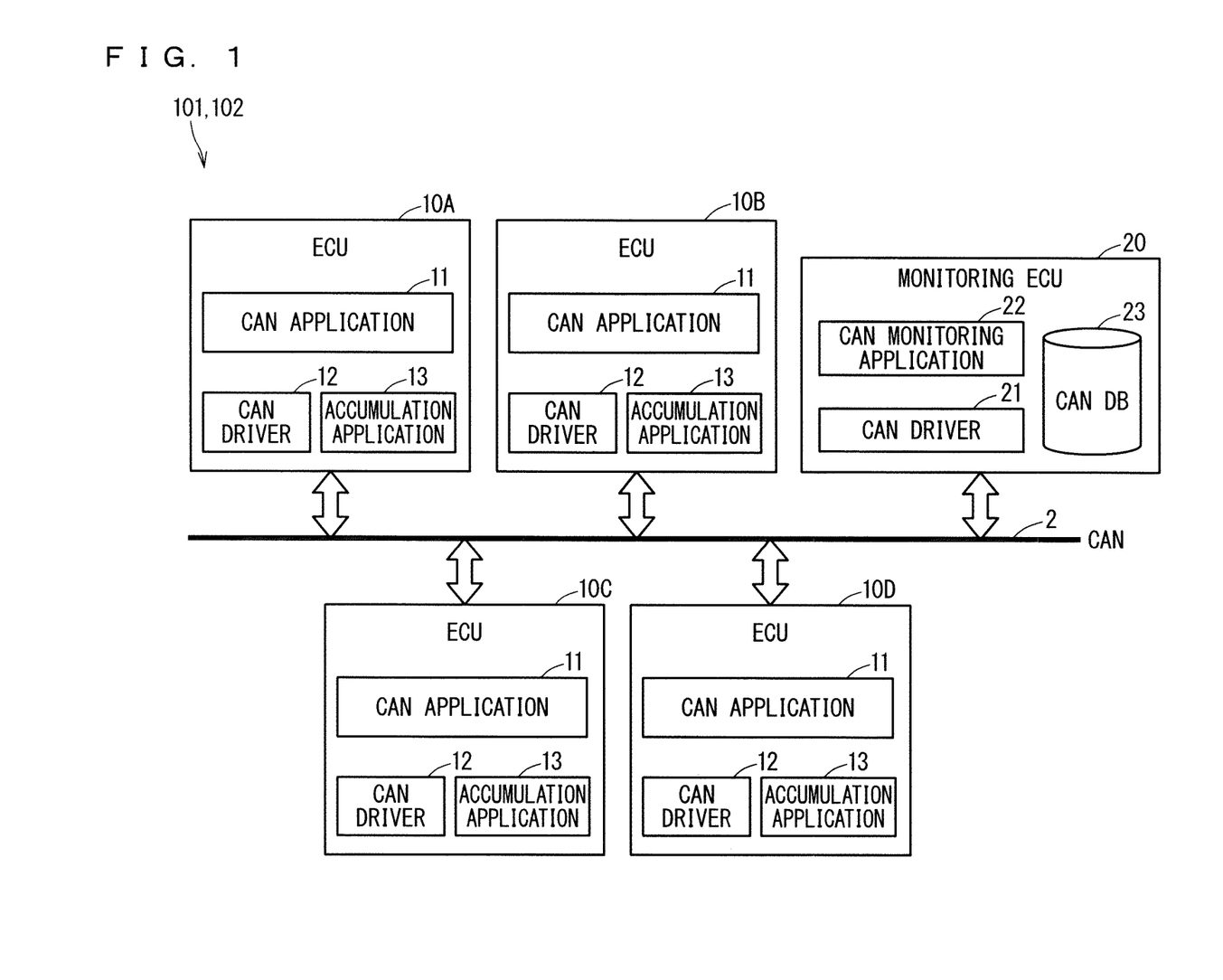
FIG. 1 A configuration diagram of a CAN system according to Embodiment 1.

FIG. 1 is a configuration diagram of a CAN system 101 according to Embodiment 1. As illustrated in FIG. 1, the CAN system 101 includes ECUs 10A to 10D and a monitoring ECU 20. The ECUs 10A to 10D and the monitoring ECU20 are connected to one CAN communication line 2 and transmit and receive CAN messages according to a protocol such as CAN or CAN-FD via the CAN communication line 2. The ECUs 10A to 10D and monitoring ECU20 are mounted on the same vehicle. Although FIG. 1 illustrates four ECUs 10A to 10D as the configuration of the CAN system 101, the number of ECUs provided in the CAN system 101 is not limited thereto. When it is unnecessary to distinguish individual ECUs in the following description, ECUs 10A to 10D are simply referred to as ECUs 10.

Next, the configuration of the ECUs 10 will be described. The ECUs 10 are an in-vehicle control device and controls each unit of the vehicle. The ECUs 10 transmit and receive CAN messages to and from each other via the CAN communication line 2. The ECUs 10 include a CAN application 11, a CAN driver 12, and an accumulation application 13. The CAN application 11 performs various processes related to the vehicle control.

The CAN driver 12 transmits and receives CAN messages. Here, the CAN message transmitted by each ECU 10 to the other ECU 10 is referred to as a first CAN message, and the CAN message transmitted by each ECU 10 to the monitoring ECU 20 is referred to as a second CAN message. That is, the CAN driver 12 functions as a transmission unit for transmitting the first CAN message.

The accumulation application 13 has a memory 14 (see FIG. 4), and accumulates the CANID of the CAN message transmitted by the CAN driver 12 in the memory 14 as a transmission CANID. The transmission CANID accumulated in the memory 14 is updated at any time such as at regular intervals. Accordingly, the accumulation application 13 functions as an accumulation unit that accumulates the CANIDs of a plurality of first CAN messages transmitted by the CAN driver 12 in the past fixed period as the transmission CANIDs.

The CAN driver 12 transmits the transmission CANID accumulated in the memory 14 to the monitoring ECU 20 as a second CAN message at regular intervals. This interval is, for example, 1 second.

Next, the configuration of a CAN message will be described. There are four types of frames in a CAN messages: a data frame, a remote frame, an error frame, and an overload frame. Of the frames, a data frame is used for standard communication. The data frame includes a Start of Frame, an Arbitration field, a Control field, a Data field, a CRC field, an Acknowledge field, and an End of Frame. The Start of Frame indicates the beginning of the data frame. The Arbitration field is a field used for arbitration of CAN communication, and the value described here is referred to as CANID. CANID represents the type and priority of the CAN messages. The Control field defines the data size of the Data field in the data frame. However, the data size of the Data field in one data frame is a maximum of 8 bytes. The Data field represents the data body. The CRC field is information on whether or not the data frame is legitimate. The Acknowledge field is used to confirm whether or not the data frame has been normally received. The End of Frame indicates the end of the data frame. The above relates to the regulation of the physical layer communicated by the CAN communication line 2.

Figure 2:
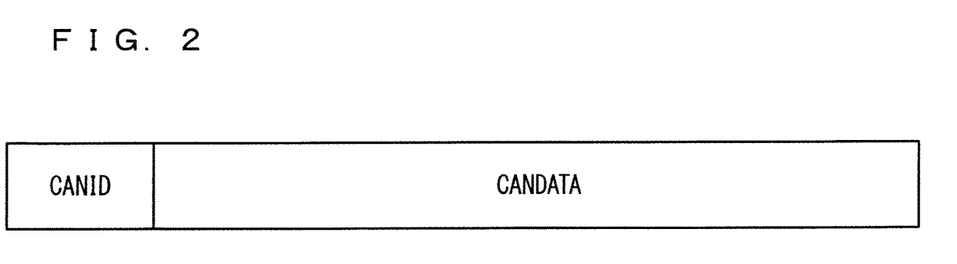
FIG. 2 A configuration diagram of a CAN message.

FIG. 2 is a diagram illustrating the Arbitration field and the Data field of a CAN message. The CANID is described in the Arbitration field and CANDATA is described in the Data field. If the CANDATA does not fit in one data frame, the CANDATA will be split into a plurality of data frames. Therefore, as with other communication methods, CAN messages can be transmitted and received in a plurality of data frames.

Figure 3:
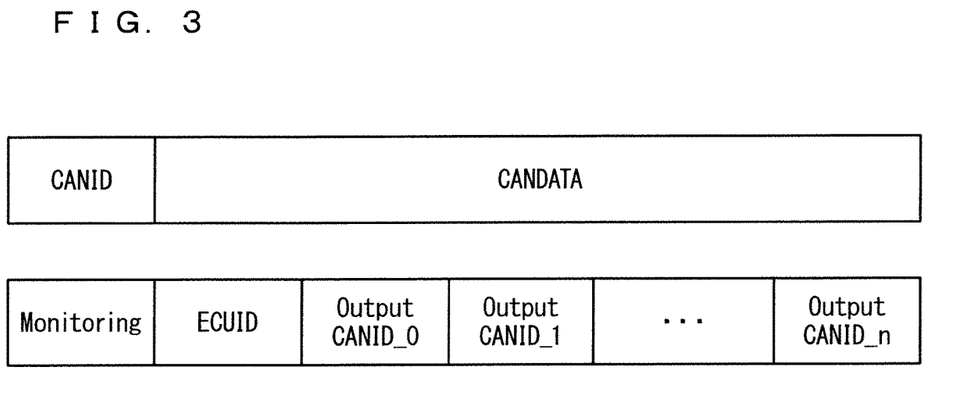
FIG. 3 configuration diagram of a second CAN message.

FIG. 3 is a diagram illustrating the Arbitration field and the Data field of a second CAN message. The CANID of the second CAN message is an 11-bit or 29-bit bit stream indicating "Monitoring". In the CANDATA of the second CAN message, the ECUID of the source ECU of the second CAN message and the transmission CANID (Output CANID) being the CANID of all the first CAN message sources transmitted by the ECU in the latest interval are described. In FIG. 3, n transmit CANIDs are illustrated as Output CANID_0, Output CANID_1, . . . Output CANID_X.

Next, the configuration of the monitoring ECU 20 will be described. The monitoring ECU 20 is an ECU mounted on the same vehicle as the ECUs 10, which monitors the first CAN message transmitted and received by the ECUs 10, and determines the legitimacy of the ECUs 10. The monitoring ECU 20 includes a CAN driver 21, a CAN monitoring application 22, and a CAN database (DB) 23. The CAN driver 21 transmits and receives CAN messages to and from the CAN communication line 2. The CAN driver 21 receives the second CAN messages. That is, the CAN driver 21 functions as a reception unit that receives the second CAN messages including the transmission CANID accumulated in an ECU 10 and the source ECUID being the ECUID of the ECU 10.

By design, the CAN messages that each ECU 10 can legitimately transmit are defined. In the CAN DB 23, a legitimate CANID, which is a CANID of a CAN message that can be legitimately transmitted by each ECU 10, is recorded as design information. That is, the CAN DB 23 functions as a storage unit that stores a legitimate CANID, which is a predetermined CANID for each ECU 10, in association with an ECUID of each ECU 10.

The CAN monitoring application 22 acquires the ECUID representing the source ECU and the Output CANID representing the CANID of the first CAN message transmitted by the source ECU in the latest interval from the second CAN message received by the CAN driver 21. Then, the CAN monitoring application 22 determines the legitimacy of the source ECU by collating the Output CANID with the legitimate CANID associated with the ECUID in the CAN database 23. Specifically, the CAN monitoring application 22 determines that the source ECU is legitimate if all the Output CANIDs contained in the second CAN message match the legitimate CANID, and if not, it determines that it is illegitimate, that is, determines that the source ECU might have been manipulated. That is, the CAN monitoring application 22 serves as a collation unit that collates the transmission CANID with the legitimate CANID associated with the source ECUID in the CAN DB 23, and determines that the first CAN message with the transmission CANID that does not match the legitimate CANID is illegitimate.

Figure 4:
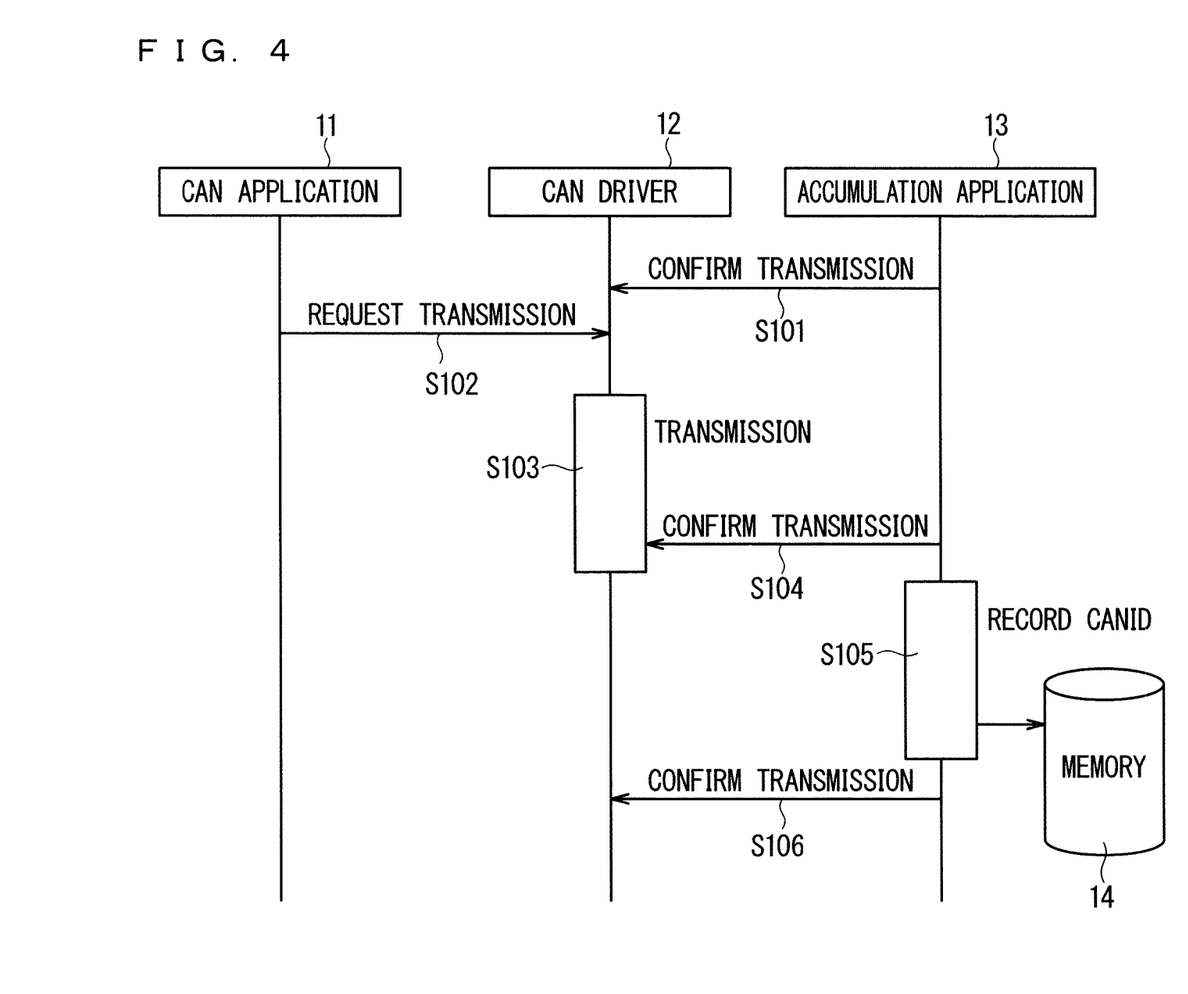
FIG. 4 A sequence diagram of an ECU in a CANID accumulation process of a first CAN message.

FIG. 4 illustrates a sequence related to the CANID accumulation process in an ECU 10. The accumulation application 13 repeatedly confirms transmission to the CAN driver 12 at regular intervals (Step S101, Step S104, and Step S106). At the time of the first transmission confirmation (Step S101), the CAN driver 12 has not yet transmitted the first CAN message. Next, the CAN application 11 requests the CAN driver 12 to transmit the first CAN message (Step S102). Then, the CAN driver 12 creates a data frame in response to the transmission request from the CAN application 11 and transmits the first CAN message on the CAN communication line 2 (Step S103).

After that, the accumulation application 13 performs a second transmission confirmation to the CAN driver 12 (Step S104). At this time, the CAN driver 12 is transmitting the first CAN message; therefore, the accumulation application 13 records the CANID of the first CAN message as the transmission CANID in the memory 14 (Step S105).

After that, the accumulation application 13 performs a third transmission confirmation to the CAN driver 12 (Step S106). However, at this time, the CAN driver 12 is not transmitting the first CAN message, the accumulation application 13 does not record the CANID.

Figure 5:
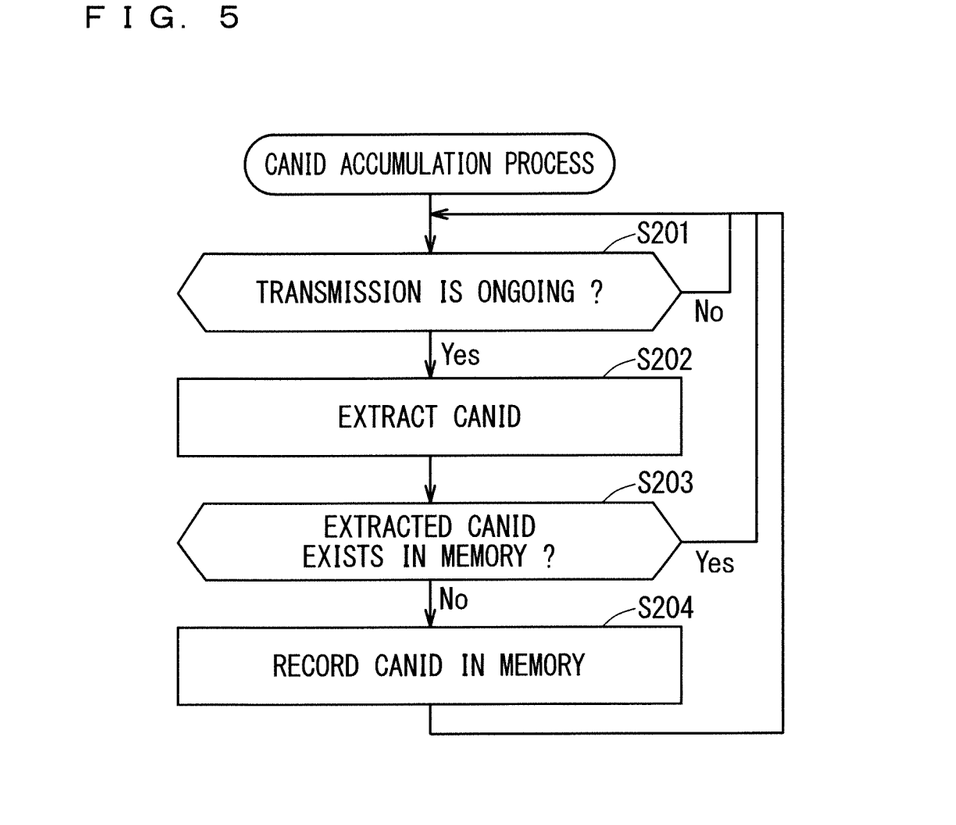
FIG. 5 A flowchart illustrating the operation of an accumulation application in the CANID accumulation process.

FIG. 5 is a flowchart illustrating the operation of an accumulation application 13 in the CANID accumulation process. In FIG. 5, first, the accumulation application 13 determines whether or not the CAN driver 12 is transmitting the first CAN message (Step S201). If the CAN driver 12 is not transmitting the first CAN message in Step S201, the accumulation application 13 performs the process of Step S201 again after the regular interval has elapsed. When the CAN driver 12 is transmitting the first CAN message in Step S201, the accumulation application 13 extracts the CANID from the first CAN message (Step S202). Then, the accumulation application 13 determines whether or not the CANID extracted in Step S202 exists in the memory 14 (Step S203). In Step S203, if the CANID extracted in Step S202 exists in the memory 14, the operation of the accumulation application 13 returns to Step S201. In Step S203, if the CANID extracted in Step S202 does not exist in the memory 14, the accumulation application 13 records the CANID in the memory 14 (Step S204) and returns to Step S201. Accordingly, the accumulation application 13 accumulates the CANIDs of the first CAN messages in the memory 14.

Figure 6:
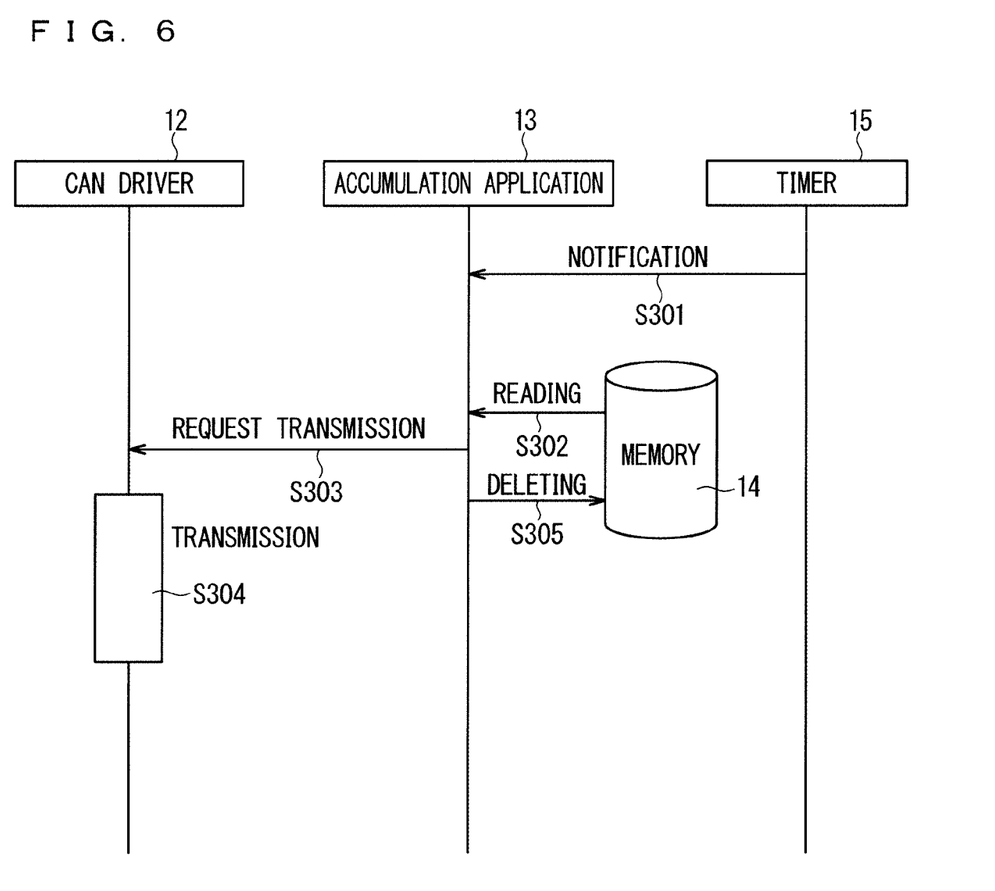
FIG. 6 A diagram illustrating a sequence related to the transmission process of a second CAN message in an ECU.

FIG. 6 is a diagram illustrating a sequence related to the transmission process of the second CAN message in an ECU. As illustrated in FIG. 6, an ECU 10 includes a timer 15. The timer 15 starts at regular intervals and notifies the accumulation application 13 of the start of transmission of the second CAN message. When the timer 15 notifies the accumulation application 13 of the start of transmission of the second CAN message (Step S301), the accumulation application 13 reads all the CANIDs accumulates in memory 14 (Step S302), outputs the CANIDs and ECUID to the CAN driver 12, and requests the transmission of the second CAN message according to the message content illustrated in FIG. 3 (Step S303). When receiving the transmission request from the accumulation application 13, the CAN driver 12 transmits a second CAN message (Step S304). The accumulation application 13 deletes the CANIDs accumulated in the memory 14 after the transmission request in Step S303 (Step S305). Consequently, only the CANID of the latest interval that has not been transmitted to the monitoring ECU 20 as the second CAN message is accumulated in the memory 14.

Figure 7:
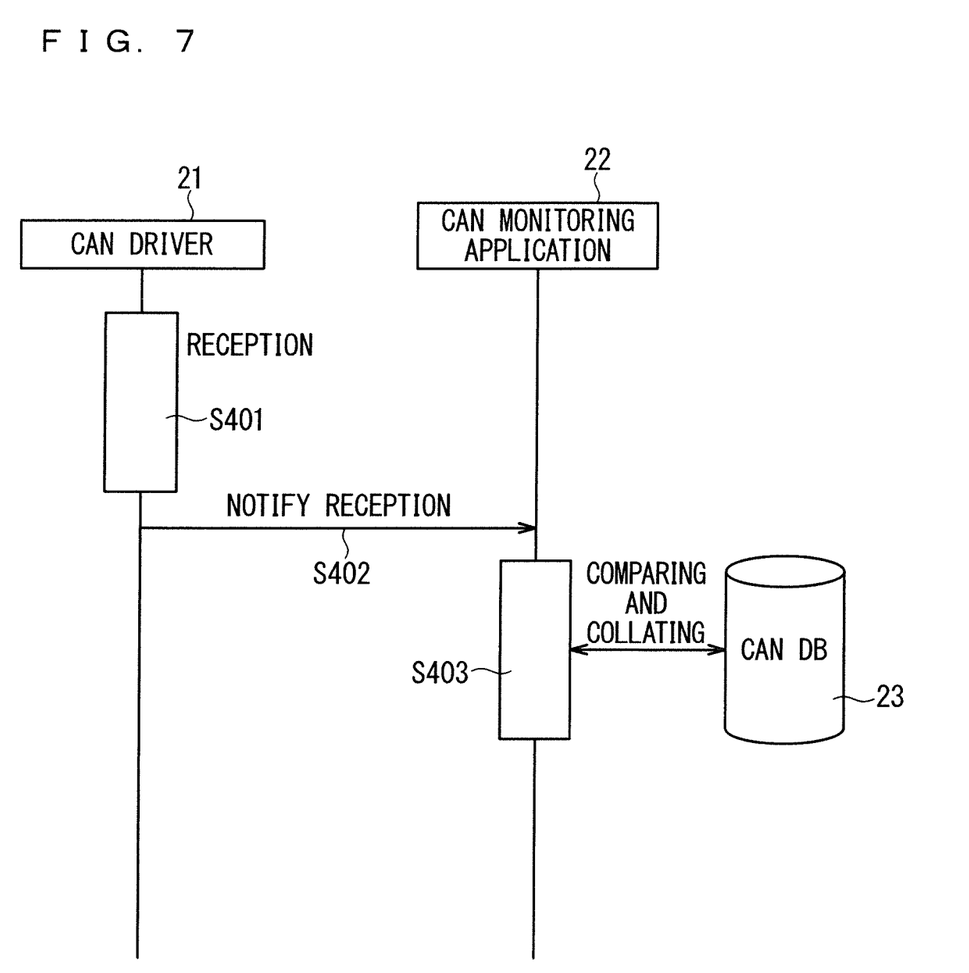
FIG. 7 A diagram illustrating a sequence related to the reception process of the second CAN message in a monitoring ECU.

FIG. 7 is a diagram illustrating a sequence related to the reception process of the second CAN message in the monitoring ECU 20. As illustrated in FIG. 7, the CAN driver 21 of the monitoring ECU 20 receives the CAN message when the CANID of the CAN message transmitted from the ECU 10 is Monitoring illustrated in FIG. 3 (Step S401). Here, the CAN message received by the CAN driver 21 is the second CAN message. Next, the CAN driver 21 notifies the CAN monitoring application 22 that the second CAN message has been received (Step S402). Then, the CAN monitoring application 22 compares and collates the plurality of Output CANIDs included in the second CAN message received in Step S401 with the legitimate CANIDs in CAN DB 23 (Step S403). Specifically, in CAN DB 23, the legitimate CANID associated with the same ECUID as the ECUID in the second CAN message is compared and collated with a plurality of Output CANIDs in the second CAN message. Then, if there is an Output CANID does not match the legitimate CANID among the plurality of Output CANIDs in the second CAN message, the CAN monitoring application 22 regards the Output CANID as an illegitimate CANID and determines the ECUID included in the second CAN message as an illegitimate ECUID.

Figure 8:
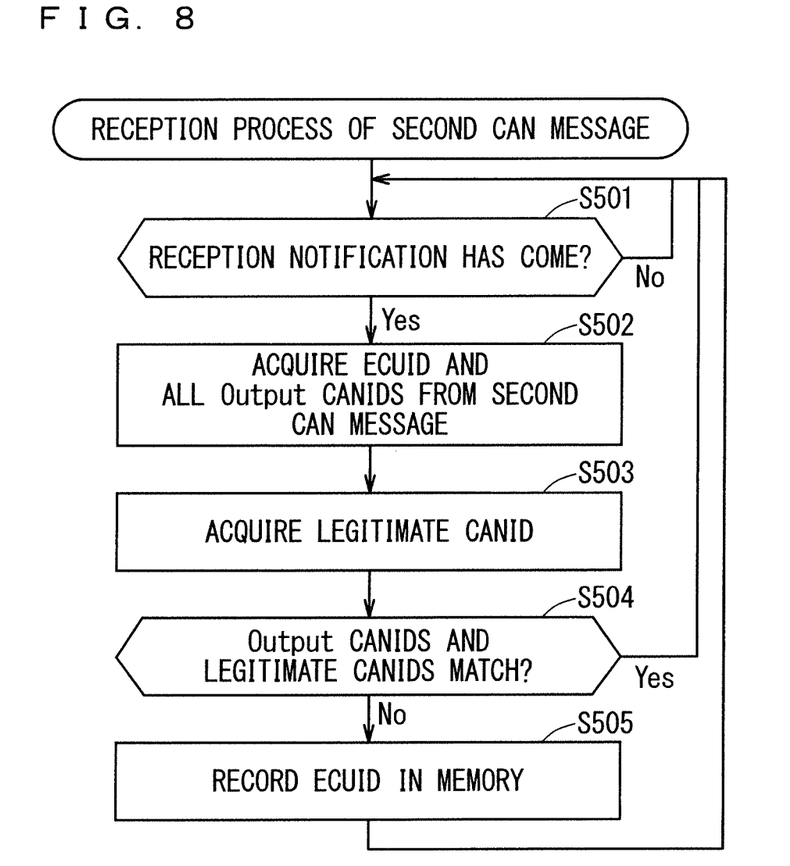
FIG. 8 A flowchart illustrating the operation of a CAN monitoring application in a reception process of the second CAN message.

FIG. 8 is a flowchart illustrating the operation of the CAN monitoring application 22 in a reception process of the second CAN message. First, the CAN monitoring application 22 determines whether there is reception notification of a second CAN message from the CAN driver 12 (Step S501). If there is no reception notification of the second CAN message from the CAN driver 12 in Step S501, the CAN monitoring application 22 repeats the process of Step S501. In Step S501, if there is a reception notification of the second CAN message received from the CAN driver 12, the CAN monitoring application 22 extracts data from the received second CAN message and acquires the ECUID and all Output CANIDs (Step S502).

Then, the CAN monitoring application 22 searches the CAN DB 23 for the ECUID acquired in Step S502, and acquires a legitimate CANID associated with the ECUID (Step S503). That is, the legitimate CANID is a CANID representing the type of CAN message that can be legitimately transmitted by the ECU specified by the ECUID.

Next, the CAN monitoring application 22 compares all the Output CANIDs acquired in Step S502 with the legitimate CANIDs acquired in Step S503, and determines whether the Output CANIDs and the legitimate CANIDs match each other (Step S504). When all the Output CANIDs match the legitimate CANIDs, the CAN monitoring application 22 determines that the ECU being the source of the second CAN message is legitimate, and returns to waiting for the reception of the second CAN message (Step S501). Meanwhile, when there is an Output CANID that is different from the legitimate CANIDs among the Output CANIDs, the CAN monitoring application 22 determines that the source ECU of the second CAN message may have been manipulated, and determines that the source ECU of the second CAN message as an illegitimate ECU. The Output CANID, which is different from the legitimate CANID, is the CANID of the first CAN message illegitimately transmitted from the illegitimate ECU, and is referred to as the illegitimate CANID. The CAN monitoring application 22 records the illegitimate ECUID, which is the ECUID of the illegitimate ECU, and the illegitimate CANID in the memory 14 (Step S505).

Each of the ECUs 10 in the CAN system 101 of Embodiment 1 includes the CAN driver 12 being a transmission unit for transmitting the first CAN message to other ECUs 10 and the accumulation application 13 being an accumulation unit for accumulating the CANIDs of a plurality of first CAN messages transmitted by the transmission unit as transmission CANID. Accordingly, in the CAN system 101, the transmission CANID being the data related to the first CAN message transmitted by the ECU 10, is accumulated in the ECU 10. Therefore, the monitoring ECU 20 is not required to accumulate the transmission CANE) each time the ECU 10 transmits the first CAN message. Further, the transmission CANIDs related to a plurality of first CAN messages can be collectively transmitted from the ECUs 10 to the monitoring ECU 20, the number of communications from the ECUs 10 to the monitoring ECU 20 can be reduced. The accumulation application 13 only performs a process of accumulating the transmission CANIDs, and does not perform any particular determination process. Therefore, the ECUs 10 do not require much memory other than for accumulating the transmission CANIDs. Therefore, the realization of the ECU 10 is ensured in a simple manner by incorporating the accumulation application 13 into a general-purpose ECU.

The monitoring ECU 20 in CAN system 101 of Embodiment 1 includes a storage unit that stores a legitimate CANID, which is a predetermined CANID for each ECU 10, in association with an ECUID of each ECU 10, a reception unit that receives the second CAN messages including the transmission CANID accumulated in the accumulation unit and the source ECUID being the ECUID of each ECU 10, and a collation unit that collates the transmission CANID with the legitimate CANID associated with the source ECUID in the storage unit, and determines that the first CAN message with the transmission CANID that does not match the legitimate CANID is illegitimate. In this manner, the monitoring ECU 20 determines the legitimacy of each ECU 10 based on the second CAN message. The transmission CANID is accumulated in each ECU 10, the monitoring ECU 20 is not required to accumulate the transmission CANID.

B. Embodiment 2

Although, a CAN system 102 of Embodiment 2 has the same configuration as the CAN system 101 of Embodiment 1 illustrated in FIG. 1, in addition to the functions of the CAN system 101, the CAN system 102 has a function of restricting the transmission of CAN messages in an illegitimate ECU (hereinafter referred to as a "transmission restriction function"). The operation of the CAN system 102 regarding the transmission restriction function will be described below. Regarding the transmission restriction function, the monitoring ECU 20 performs the transmission process of a third CAN message, and each ECU 10 performs the reception process of the third CAN message. The third CAN message will be described later referring to FIG. 11.

Figure 9:
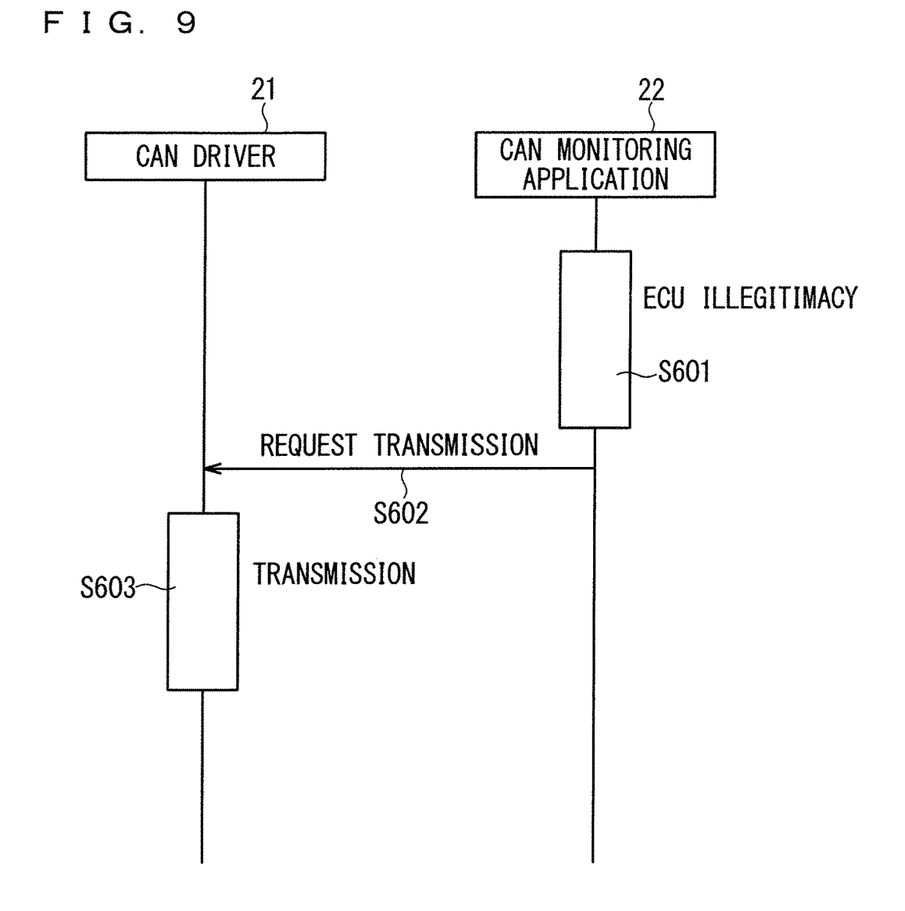
FIG. 9 A diagram illustrating a sequence of the transmission process of a third CAN message in the monitoring ECU.

FIG. 9 is a diagram illustrating a sequence of the transmission process of the third CAN message by the monitoring ECU 20. First, when the CAN monitoring application 22 determines that an ECU 10 is an illegitimate ECU (Step S601), the CAN monitoring application 22 requests the CAN driver 21 to transmit the third. CAN message (Step S602). The CAN driver 21 that has received the transmission request transmits the third CAN message on the CAN communication line 2 (Step S603). Accordingly, the CAN driver 21 functions as a transmission unit that transmits the third CAN message to each ECU 10 when the CAN monitoring application 22 being a collation unit determines that the first CAN message is illegitimate.

Figure 10:
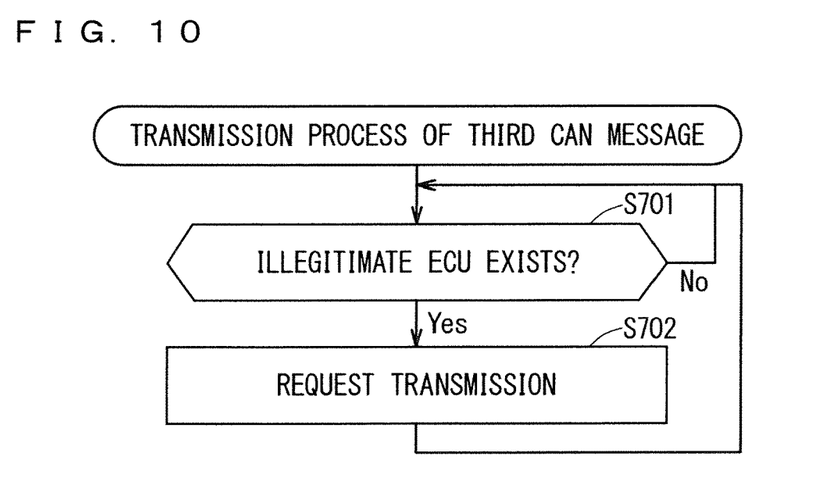
FIG. 10 A flowchart illustrating the operation of a CAN monitoring application in the transmission process of the third CAN message.

FIG. 10 is a flowchart illustrating the operation of the CAN monitoring application 22 in a transmission process of the third CAN message. First, the CAN monitoring application 22 determines whether there is an illegitimate ECU based on the newly received second CAN message (Step S701). The CAN monitoring application 22 repeats the process of Step S701 until the CAN monitoring application 22 detects an illegitimate ECU. If an illegitimate ECU exists in step S701, the CAN monitoring application 22 outputs the illegitimate ECUID and the illegitimate CANID to the CAN driver 21 and issues the transmission request of the third CAN message (step S702). Then, the CAN monitoring application 22 returns to the process of Step S701.

Figure 11:
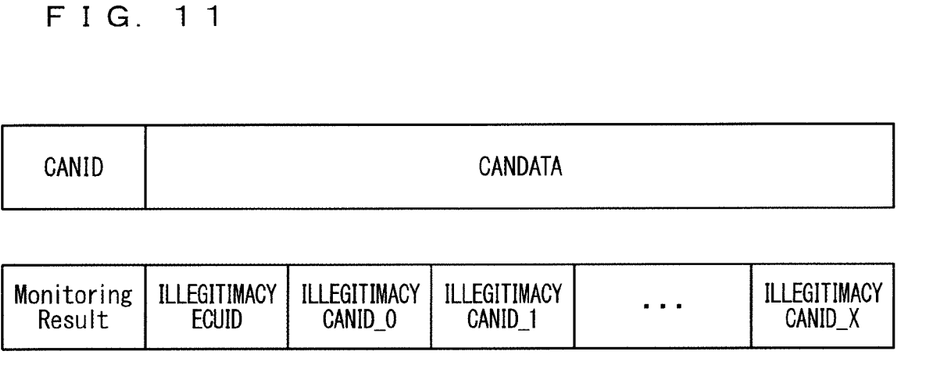
FIG. 11 A diagram illustrating an Arbitration field and a Data field of the third CAN message.

FIG. 11 illustrates the Arbitration field and the Data field of the third CAN message. The CANID of the third CAN message is an 11-bit or 29-bit bit stream indicating "MonitoringResult". CANDATA in the third CAN message contains an illegitimate ECUID and illegitimate CANIDs. In FIG. 11, X illegitimate CANIDs are illustrated as illegitimate CANID_0, illegitimate CANID_1, . . . illegitimate CANID_X.

Figure 12:
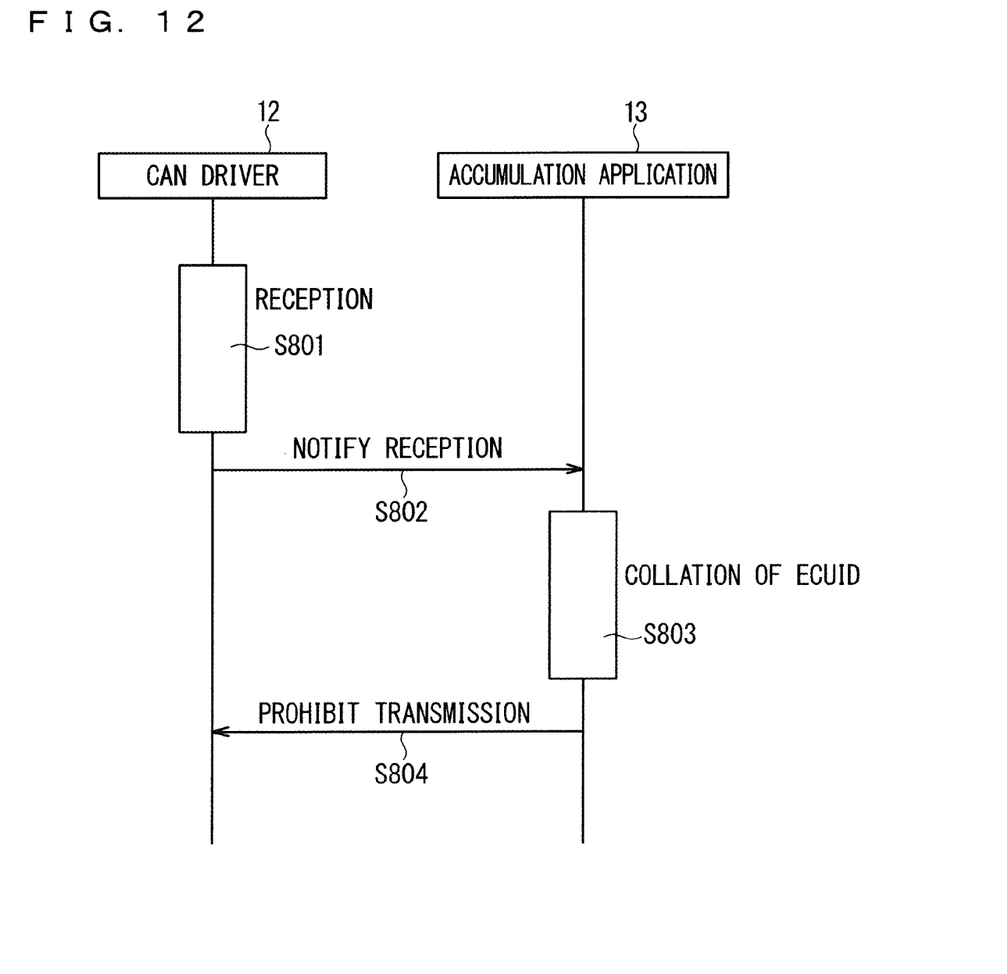
FIG. 12 A diagram illustrating a sequence of the reception process of the third CAN message by each monitoring ECU 10.

FIG. 12 illustrates a sequence of the reception process of the third CAN message by each ECU 10. First, the CAN driver 12 of the ECU 10 receives a CAN message (Step S801). When the CANID of the received CAN message is "MonitoringResult", the CAN driver 12 notifies the accumulation application 13 of the reception of the third CAN message (Step S802). Then, the accumulation application 13 compares and collates the illegitimate ECUID in the received third CAN message with its own ECUID (Step S803), and if they match, prohibits the CAN driver 12 from transmitting the CAN message (Step S804).

Figure 13:
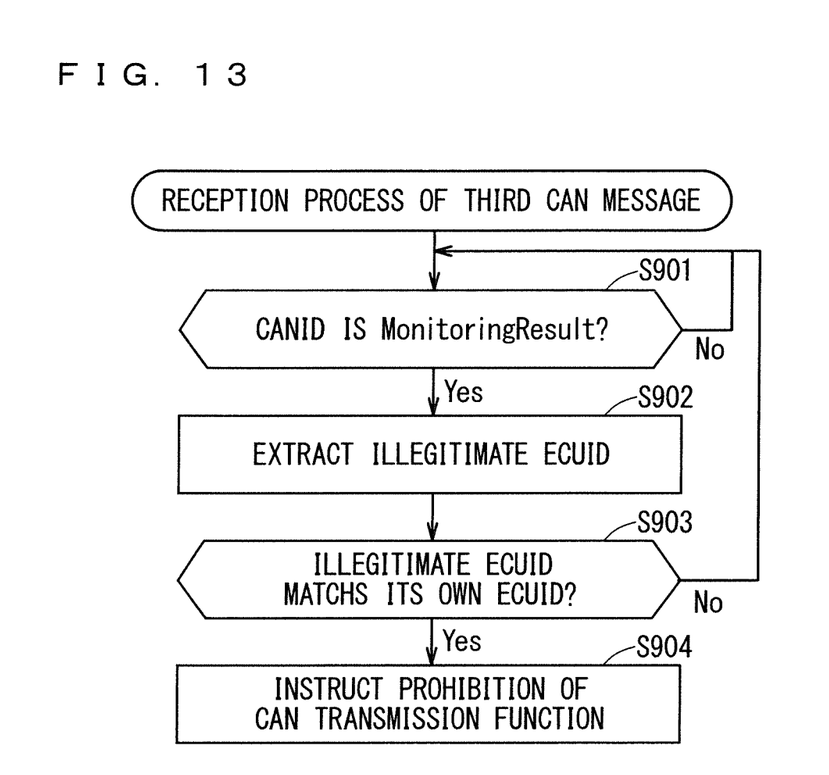
FIG. 13 A flowchart illustrating the operation of an accumulation application in the reception process of the third CAN message.

FIG. 13 is a flowchart illustrating the operation of the accumulation application 13 in a reception process of the third CAN message. First, the accumulation application 13 determines whether or not the CANID of the CAN message received by the CAN driver 12 is "MonitoringResult" (Step S901). When the CANID is not "MonitoringResult" in Step S901, the accumulation application 13 repeats the process of Step S901 again. When the CAN ID is "MonitoringResult" in Step S901, the accumulation application 13 extracts an illegitimate ECUID from the received CAN message, that is, the third CAN message (Step S902). Then, the accumulation application 13 compares and collates the illegitimate ECUID extracted in Step S902 with its own ECUID (Step S903), and returns to the process of Step S901 when the two do not match. When the illegitimate ECUID matches its own ECUID in Step S903, the accumulation application 13 prohibits the CAN driver 12 from transmitting the CAN message (Step S904). As a result, the illegitimate ECU that received the third CAN message is prohibited from transmitting the CAN message from this point onward.

In Step S804 of FIG. 12 or Step S904 of FIG. 13, the accumulation application 13 may prohibit the transmission of all CAN messages, or may prohibit only the transmission of CAN messages with an illegitimate CANID. When the accumulation application 13 prohibits the transmission of all CAN messages, the third CAN message does not need to contain an illegitimate CANID.

The monitoring ECU 20 in the CAN system 102 of Embodiment 2 includes a CAN driver 21 being a transmission unit that transmits a third CAN message to each ECU when the CAN monitoring application 22 being a collation unit determines that the first CAN message is illegitimate. And the third CAN message contains an illegitimate ECUID. The illegitimate ECUID is an ECUID included in the second CAN message including the illegitimate CANID being the CANID of the first CAN message determined to be illegitimate. As a result, this enables to notify the ECU 10 that has transmitted the first CAN message determined to be illegitimate to that effect.

Further, in the CAN system 102 of Embodiment 2, the ECU 10 that has received the third CAN message from the monitoring ECU 20 prohibits the transmission of the first CAN message when the illegitimate ECUID included in the third CAN message matches its own ECUID. As a result, communication by the manipulated illegitimate ECU 10 is restricted.

C. Embodiment 3

Figure 14:
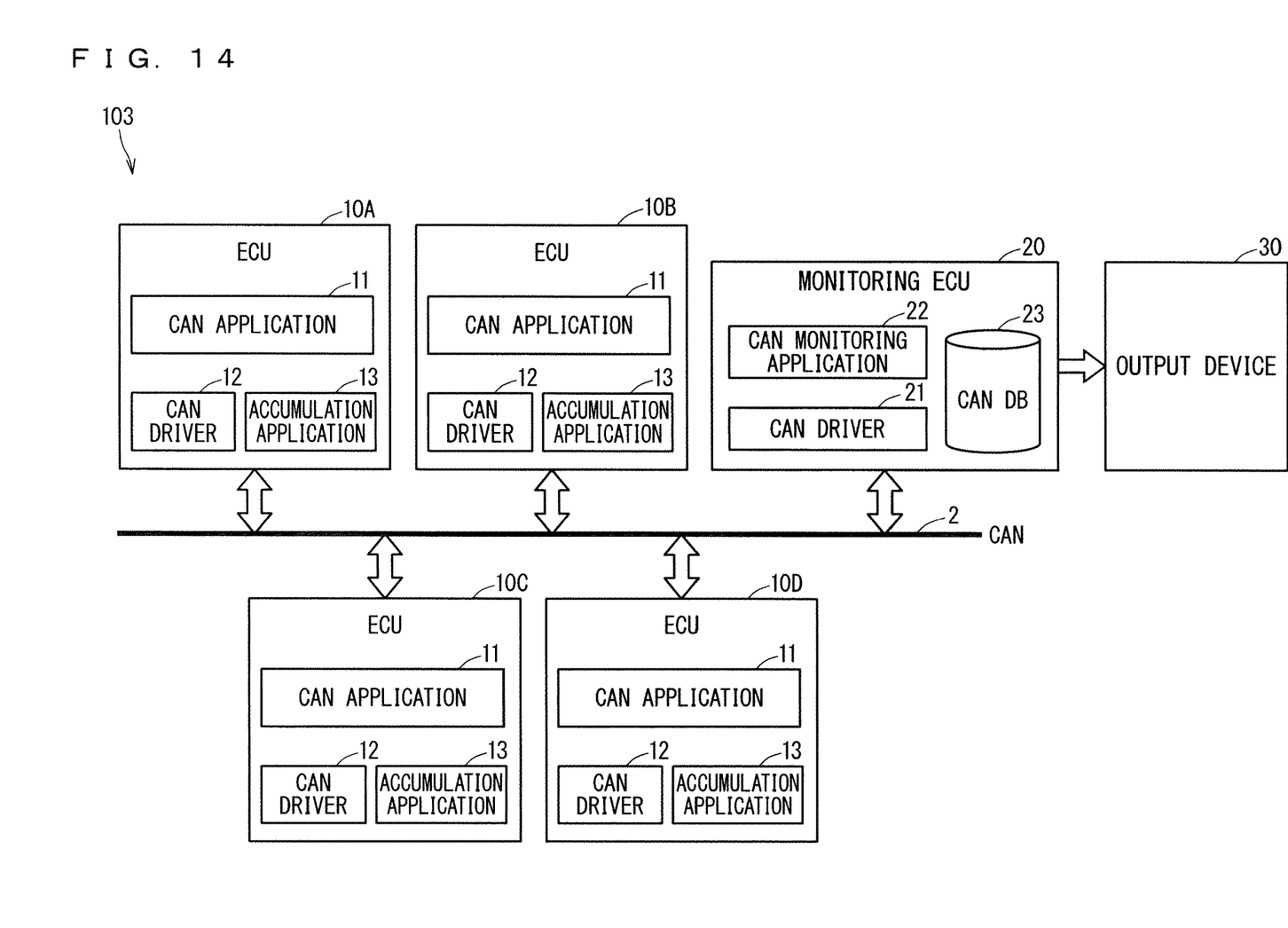
FIG. 14 A configuration diagram of a CAN system according to Embodiment 3.

FIG. 14 is a block diagram illustrating a configuration a CAN system 103 according to Embodiment 3. The CAN system 103 includes an output device 30 connected to the monitoring ECU 20 in addition to the configurations of the CAN system 101 or 102 of Embodiment 1 or 2. The output device 30 is not connected to the CAN communication line 2. The output device 30 is, for example, a display device or an audio output device mounted on the same vehicle as the ECUs 10 and the monitoring ECU 20. Alternatively, the output device 30 may not be mounted on the vehicle, and may be, for example, a general-purpose personal computer, or a mobile terminal such as a PDA or a smartphone carried by a vehicle driver or the like.

The monitoring ECU 20 has a function of transmitting information on an illegitimate ECU to the output device 30 in addition to the functions described in Embodiment 1 or 2. That is, when determining that the first CAN message is illegitimate, the CAN monitoring application 22 of the monitoring ECU 20 functions as a notification unit that notifies the output device 30 to that effect. Here, the information of the illegitimate ECU includes the illegitimate ECUID and may include the illegitimate CANID. The output device 30 that receives the information of the illegitimate ECU from the monitoring ECU 20 performs its notification to that effect to the driver of the vehicle by display or audio output. As an example, the output device 30 having a display function may display an error message such as "Communication of illegitimate CAN messages has been confirmed. Please consult the dealer".

The monitoring ECU 20 in the CAN system 103 of Embodiment 3 is connected to the output device 30 which is not connected to the CAN communication line 2 includes a notification unit that notifies the output device 30 of that effect when the collation unit determines that the first CAN message is illegitimate. Therefore, this enables to notify a user such as a vehicle driver of the illegitimate ECU 10 to prompt the user to take a countermeasure.

D. Embodiment 4

Figure 15:
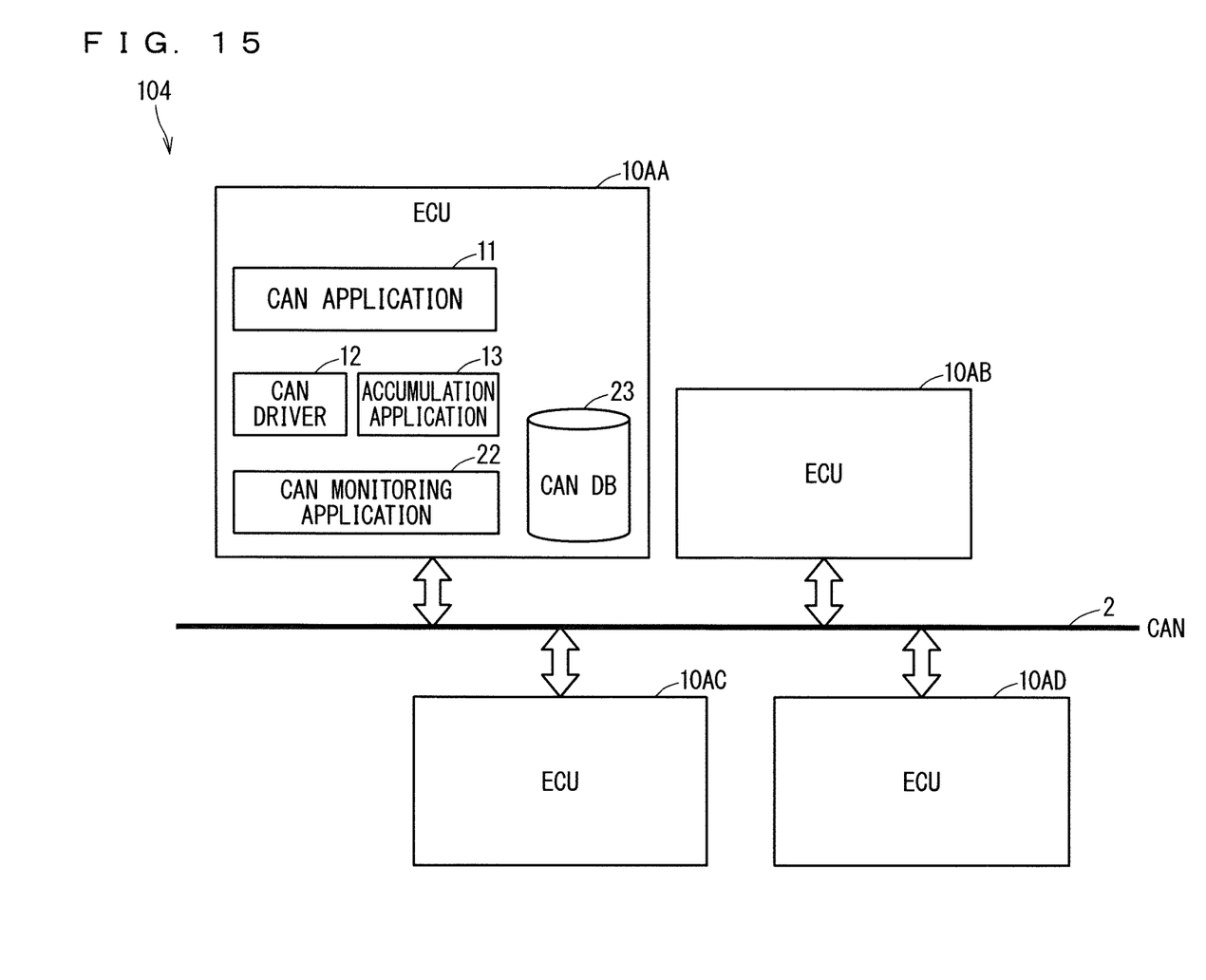
FIG. 15 A configuration diagram of a CAN system according to Embodiment 4.

FIG. 15 is a configuration diagram of a CAN system 104 according to Embodiment 4. In the CAN system 104, the monitoring ECU 20 is deleted from the CAN system 101 of Embodiment 1, and ECUs 10AA to 10AD are provided in place of the ECUs 10A to 10D. The configuration of ECUs 10AA to 10AD is the same; therefore, only the configuration of ECU 10AA is illustrated in FIG. 15. The ECU 10AA includes the CAN monitoring application 22 and the CAN DB 23 of the monitoring ECU 20 of Embodiment 1 in addition to the configuration of the ECU 10A of Embodiment 1.

In the ECU 10AA, the accumulation application 13 accumulates the CANID of the first CAN message transmitted from the CAN driver 12 to other ECUs in the memory 14 for a certain period of time. Then, the CAN monitoring application 22 compares and collates the CANID accumulated in the memory 14 with the legitimate CANID stored in the CAN DB 23, and when they do not match, the CAN monitoring application 22 determines that the first CAN message related to the CANID is an illegitimately transmitted CAN message, and the ECU 10AA is an illegitimate ECU that may have been manipulated. Then, the CAN application 11 prohibits the CAN driver 12 from transmitting a CAN message.

According to the CAN system 104 of Embodiment 4, the accumulation of the CANID, the determination of the legitimacy by the collation of the CANID, and the transmission restriction of the CAN message are all performed in each ECU 10AA to LOAD, a separate monitoring ECU 20 is not required to be provided. Therefore, communicating the second CAN message or the third CAN message in order to perform the above process is not required, which has the effect of reducing the amount of CAN communication.

E. Hardware Configuration

Figure 16:
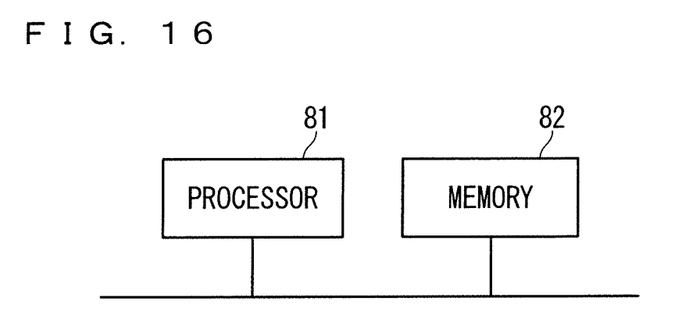
FIG. 16 A hardware configuration diagram of the ECU or the monitoring ECU.

The ECUs 10 or the monitoring ECU 20 in the CAN systems 101 to 104 described above are realized by a processor 81 and a memory 82 illustrated in FIG. 16. Specifically, the functions of CAN application 11, CAN driver 12, and accumulation application 13 in an ECU 10 and the functions of CAN driver 21 and CAN monitoring application 22 in the monitoring ECU 20 are realized by the processor 81 executing a program stored in the memory 82. The processor 81 is, for example, a central processing unit, a processing unit, an arithmetic unit, a microprocessor, a microcomputer, a Digital Signal Processor (DSP), or the like. Although, the memory 14 in which the CANID of the first CAN message is accumulated in the ECU 10 and the CAN DB 23 in the monitoring ECU 20 are realized by the memory 82, they may be composed of a single memory 82, or they may be composed of individual memories. Here, the memory 82 may be, for example, a non-volatile or volatile semiconductor memory, such as a random access memory (RAM), a read only memory (ROM), a flash memory, an erasable programmable read only memory (EPROM), an electrically erasable programmable read only memory (EEPROM), or the like.

It should be noted that Embodiments of the present invention can be arbitrarily combined and can be appropriately modified or omitted within the scope of the invention.

While the invention has been described in detail, the forgoing description is in all aspects illustrative and not restrictive. It is understood that numerous other modifications not having been described can be devised without departing from the scope of the invention.

EXPLANATION OF REFERENCE SIGNS

2 CAN communication line, 10A, 10B, 10C, 10D ECU, 11 CAN application, 12 CAN driver, 13 accumulation application, 14 memory, 20 monitoring ECU, 21 CAN driver, 22 CAN monitoring application, 23 CAN database, output device, 81 processor, 82 memory, 101, 102, 103, 104 CAN system.

The invention claimed is:

1. An ECU among a plurality of ECUs connected to a CAN communication line, the ECU comprising:
   a first processor to execute a first program; and
   a first memory to store the first program which, when executed by the first processor, performs processes of:
   transmitting first CAN messages to other ECUs of the plurality of ECUs; and
   accumulating CANIDs of the plurality of first CAN messages transmitted by the transmission unit as transmission CANIDs.

2. A monitoring ECU connecting to the CAN communication line along with the ECU according to claim 1, the monitoring ECU comprising:
   a second processor to execute a second program; and
   a second memory to store the second program which, when executed by the second processor, performs processes of:
   storing a legitimate CANID, which is a predetermined CANID for each of the ECUs, in association with an ECUID of each of the ECUs;

receiving a second CAN message including the transmission CANIDs accumulated in each of the ECUs and a source ECUID being an ECUID of each of the ECUs, from each of the ECUs; and collating the transmission CANID with the legitimate CANID associated with the source ECUID, and determining that the first CAN message with the transmission CANID that does not match the legitimate CANID is illegitimate.

3. The monitoring ECU according to claim 2, wherein the second CAN message is repeatedly acquired from each of the ECUs at regular intervals, and the second CAN message includes CANIDs of the plurality of first CAN messages transmitted from each of the ECUs in a latest interval as the transmission CANIDs.

4. The monitoring ECU according to claim 2, wherein an output device is not connected to the CAN communication line, and the output device is notified of that effect when the first CAN message is determined to be illegitimate.

5. The monitoring ECU according to claim 2, wherein a third CAN message is transmitted to each of the ECUs when the first CAN message is determined to be illegitimate, and the third CAN message includes an illegitimate ECUID being the ECUID included in the second CAN message including an illegitimate CANID being a CANID of the first CAN message determined to be illegitimate.

6. The monitoring ECU according to claim 5, wherein the third CAN message includes the illegitimate CANID.

7. The ECU according to claim 1 configured to receive a third CAN message from a monitoring ECU, wherein the monitoring ECU, connected to the CAN communication line along with the ECU according to claim 1, includes a second processor to execute a second program; and a second memory to store the second program which, when executed by the second processor, performs processes of:

storing a legitimate CANID being a predetermined CANID for each of the ECUs, in association with an ECUID of each of the ECUs, receiving a second CAN message including the transmission CANIDs accumulated in each of the ECUs and a source ECUID being an ECUID of each of the ECUs, from each of the ECUs, collating the transmission CANID with the legitimate CANID associated with the source ECUID, and determining that the first CAN message with the transmission CANID that does not match the legitimate CANID is illegitimate, and transmitting the third CAN message on the CAN communication line when the first CAN message is determined to be illegitimate, wherein the third CAN message includes an illegitimate ECUID being the ECUID included in the second CAN message including an illegitimate CANID being a CANID of the first CAN message determined to be illegitimate, and when the illegitimate ECUID included in the third CAN message matches its own ECUID, transmission of the first CAN message is prohibited.

8. The monitoring ECU according to claim 7, wherein the third CAN message includes the illegitimate ECUID and an illegitimate CANID being a CANID of the first CAN message determined to be illegitimate, and when the illegitimate ECUID included in the third CAN message matches its own ECUID, transmission of the first CAN message with the illegitimate CANID is prohibited.

9. A CAN system comprising the monitoring ECU according to claim 2; and a plurality of the ECUs.

* * * * *